(No Model.)

W. D. ARNETT.
SEEDING MACHINE.

No. 377,222. Patented Jan. 31, 1888.

ON LINE X—X

ON LINE Y—Y

Attest:
Sidney P. Hollingsworth
N. A. Kennedy

Inventor
W. D. Arnett
By his Atty.
Phil. T. Dodge.

UNITED STATES PATENT OFFICE.

WILLIAM D. ARNETT, OF DENVER, COLORADO.

SEEDING-MACHINE.

SPECIFICATION forming part of Letters Patent No. 377,222, dated January 31, 1888.

Application filed June 11, 1887. Serial No. 241,048. (No model.)

*To all whom it may concern:*

Be it known that I, WILLIAM D. ARNETT, of Denver, in the county of Arapahoe and State of Colorado, have invented certain Improvements in Seeding-Machines, of which the following is a specification.

This invention relates to that class of grain-drills and seeders in which upright rotary disks are mounted on drag-bars in planes oblique to the line of travel for the purpose of opening the seed-receiving furrows, as represented, for example, in numerous Letters Patent of the United States heretofore granted to me.

The aims of the present invention are to reduce the cost of construction and to provide simple and convenient means for regulating the width of the furrow opened by the disks, and also the depth of the furrow, and to avoid the necessity of constructing the drag-bar in several parts or pieces, as usual.

Figure 1:
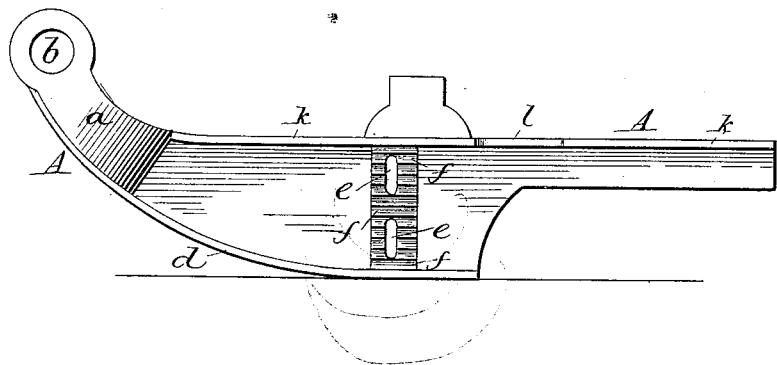
Figure 2:
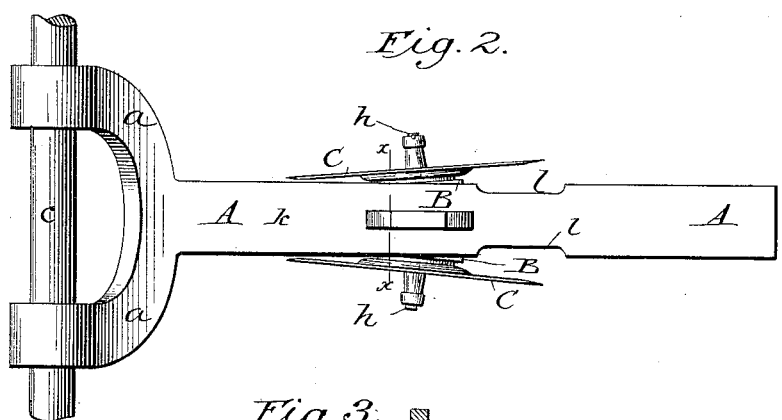
Figure 3:
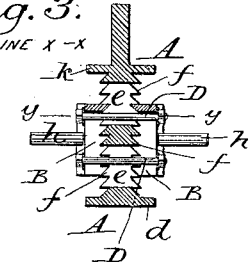
Figure 4:
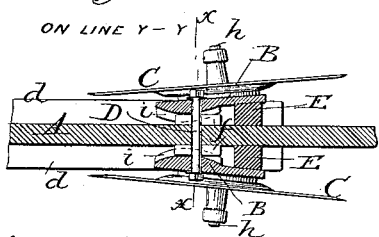
Figure 5:
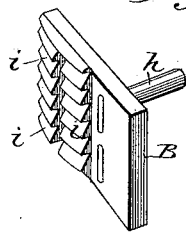

In the accompanying drawings, Figure 1 represents a side elevation of a drag-bar constructed on my improved plan, the disks and other supporting-plates being removed. Fig. 2 is a top plan view of the drag-bar with the disks in position thereon. Fig. 3 is a vertical cross-section on the line $x$ $x$. Fig. 4 is a horizontal section. Fig. 5 is a perspective view of one of the disk-supporting plates.

Referring to the drawings, A represents my improved drag-bar, which I cast complete in one piece, with its forward end divided and extended laterally into two arms, $a$ $a$, provided with horizontal openings $b$, to receive the supporting-shaft $c$, which will be connected with the wheeled frame of the machine in any appropriate manner, so as to admit of the drag-bars rising and falling freely at the rear ends to prevent them from swinging laterally.

As represented in Fig. 1, the drag-bar is curved downward from its forward end toward the rear, in order to form a runner, $d$, adapted to ride easily over and upon the surface of the ground. The top of the bar is made comparatively thin, but at the lower edge it is widened horizontally, in order to give a broad under surface to the runner. Through the bar, midway of its length or thereabout, I form two transverse vertical slots, $e$, and adjacent to these slots I form on each side of the bar a series of horizontal teeth or serrations, $f$.

B B represent two metal plates secured to opposite sides of the drag-bar, and each provided with an outwardly-extended journal or trunnion, $h$, carrying the vertical disk C. Each of these plates is provided, as shown in Fig. 5, with a series of horizontal teeth or serrations, $i$, designed to engage with corresponding teeth on the drag-bar, and thus prevent the plate from turning or sliding out of position. The plates are secured in place by means of bolts D, passing through the drag-bar and the two plates, as shown in the drawings. Between the rear end of each plate and the side of the drag-bar is inserted a block, E. By moving these blocks forward the rear ends of the plates B are turned outward from the drag-bar, and thus the disks placed at a greater angle to the line of draft and caused to open furrows of greater width. The adjustment of the blocks to the rear, on the contrary, lessens the angle of the disks to the line of draft and diminishes the width of the furrow.

In order that the plates B may be sustained firmly under their various adjustments, I give the teeth $i$ a horizontal curvature, as shown in Figs. 4 and 5, so that they may rock or roll against the toothed places of the drag-bar.

By loosening the bolts D to a sufficient extent the disengagement of the teeth $i$ is permitted, so that the plates B may be raised or lowered in relation to the under surface or runner of the drag-bar. The runner, traveling on the surface of the ground, regulates the depth to which the furrow is opened in the disk, and thus it is that the vertical adjustment of the disks upon the drag-bar changes the depth of the furrow.

I prefer to construct the drag-bar with its top widened or flanged, as shown at $k$, and to recess these flanges opposite the inner faces of the disks, as shown at $l$, these recesses serving to receive and hold in position the lower ends of the spouts or conductors through which the seed is delivered into the furrows.

I am aware that furrow-opening disks have been applied to a drag-bar, and that drag-bars having the disks journaled in a fixed position thereon have been provided with adjustable gages or runners to regulate the depth of the furrow; but I believe myself to be the first to construct the drag-bar so that it will in itself serve as a runner, and to combine therewith vertically-adjustable disks.

It is to be noted that under my construction the body of the drag-bar serves the twofold purpose of sustaining and carrying the disks and of regulating the depth to which they enter the soil.

While I have represented in the drawings two bolts D for the purpose of connecting the plates to the drag-bar, it is to be understood that a greater or less number may be employed at the discretion of the mechanic.

While I have represented the drag-bar as provided with two disks upon opposite sides inclined in opposite directions, that the lateral pressure of the one may be counteracted by that of the other, it is to be understood that, if desired, a single disk may be attached in the manner herein shown.

Having thus described my invention, what I claim is—

1. The herein-described drag-bar for a seeding-machine, cast complete in one piece, with its forward end adapted to receive the supporting-shaft $c$ and its lower edge formed with the sole or runner $d$.

2. A drag-bar having the rigid sole or runner thereon, in combination with a furrow-opening disk, a plate supporting said disk, and devices, substantially as described, connecting said plate to the drag-bar and permitting its vertical adjustment thereon.

3. The drag-bar provided with teeth or serrations, the toothed plate having the furrow-opening disk mounted thereon, the adjustable block seated between said plate and drag-bar, and a transverse bolt or bolts connecting the plate and drag-bar, substantially as described.

4. In combination with a drag-bar provided with teeth or serrations $f$, a disk-supporting plate having the curved toothed surface to engage the bar, and fastening-bolts, applied substantially as described, to connect the plate and drag-bar.

5. In combination with the furrow-opening disks attached thereto, the drag-bar provided with the top flange, $k$, containing recesses $l$, substantially as and for the purpose described.

6. In combination with the drag-bar having the slots $e$ and the teeth $f$ on both faces, the two disk-supporting plates provided with teeth and applied to opposite sides of the bar, and bolts extending transversely through the bar and both plates, substantially as described.

In testimony whereof I hereunto set my hand, this 4th day of March, 1887, in the presence of two attesting witnesses.

WILLIAM D. ARNETT.

Witnesses:
GEO. C. NORRIS,
F. A. DRISCOL.